United States Patent [19]
Wakeland

[11] Patent Number: 5,872,919
[45] Date of Patent: Feb. 16, 1999

[54] COMPUTER COMMUNICATION NETWORK HAVING A PACKET PROCESSOR WITH AN EXECUTION UNIT WHICH IS VARIABLY CONFIGURED FROM A PROGRAMMABLE STATE MACHINE AND LOGIC

[75] Inventor: Carl K. Wakeland, Austin, Tex.

[73] Assignee: Advanced Micro Devices, Inc.

[21] Appl. No.: 852,689

[22] Filed: May 7, 1997

[51] Int. Cl.⁶ .................................................. G06F 13/00
[52] U.S. Cl. ....................................... 395/200.6; 370/466
[58] Field of Search ............................ 395/200.31, 200.6, 395/200.8, 200.54, 200.58, 200.66, 200.76; 370/401, 466, 392, 351, 402, 404

[56] References Cited

U.S. PATENT DOCUMENTS

| | | | |
|---|---|---|---|
| 4,493,021 | 1/1985 | Agrawal et al. | 395/200.66 |
| 4,575,793 | 3/1986 | Morel et al. | 395/309 |
| 4,787,028 | 11/1988 | Finfrock et al. | 395/285 |
| 5,535,373 | 7/1996 | Olnowich | 370/466 |
| 5,649,315 | 7/1997 | Eaton | 455/343 |
| 5,652,783 | 7/1997 | Keba et al. | 370/313 |
| 5,678,060 | 10/1997 | Yokoyama et al. | 395/200.42 |
| 5,699,350 | 12/1997 | Kraslavsky | 370/254 |
| 5,786,770 | 7/1998 | Thompson | 370/352 |
| 5,805,816 | 9/1998 | Picazo, Jr. et al. | 395/200.53 |

OTHER PUBLICATIONS

"The Programmable Protocol VLSI Engine", by A.S. Krishnikumar, IEEE 1992.

*Primary Examiner*—Moustafa M. Meky
*Attorney, Agent, or Firm*—Kevin L. Daffer; Conley, Rose & Tayon

[57] ABSTRACT

A communication system is provided that includes a mechanism for recognizing various communication protocols. That is, the communication system employs a packet processor which can adapt to sent and receive numerous protocols. The packet processor forms a part of a network adapter card or router associated with a LAN or a WAN. The packet processor includes subsystems which can be selectively re-configured so that the processor can dispatch and recognize differing protocols. More specifically, the reconfigurable processor can dispatch and recognize differing packet and field formats associated with various communication protocols. Re-configuration is performed on select subsystems using at least a portion of a field programmable logic cell if not portions of numerous logic cells confirmed within defined areas on which the integrated processor is fabricated. As such, the logic cells can be programmed at the user site and, after program, function at a high performance level.

17 Claims, 6 Drawing Sheets

COMPUTER COMMUNICATION NETWORK HAVING A PACKET PROCESSOR WITH AN EXECUTION UNIT WHICH IS VARIABLY CONFIGURED FROM A PROGRAMMABLE STATE MACHINE AND LOGIC

BACKGROUND OF THE INVENTION

1. Field of the Invention

This invention relates to a communication system architecture and more particularly to a packet processor employed within a communication network. The packet processor is variably configurable to handle different protocols forwarded over the network.

2. Description of the Relevant Art

A recent trend in the modem workplace is for individuals to work at remote sites and periodically connect to an office or central data site. Those individuals are often termed "telecommuters", and are defined as workers or employees who work from a remote site within their home, that site being connected to the central, corporate office. Another recent trend in the workplace is that of remote small offices or branch offices, wherein a group of workers or employees are situated in a location remote from the corporate headquarters. Those individuals are also electronically connected to the corporate office/headquarters. This movement away from the corporate or central site, and the benefit gained by avoiding a physical commute appears to be a trend which is here to stay. In all likelihood, this trend will continue given the transient nature by which most modern workers operate.

Remotely situated workers require transparent connectivity not only to the corporate office but also to the office's local area network (LAN). As corporations move away from mainframe based systems to personal computer (PC) systems linked together by LANs, the options for remote connectivity have improved. In general, PCs and LANs facilitate remote access to the computing resources of the corporate office or corporate headquarters. Remote connectivity is also made possible with the arrival of affordable, reliable, digital telecommunication services and inexpensive network hardware.

Currently there is a wide variety of digital telecommunications services available. Those services must somehow be linked into an infrastructure in order for PCs to communicate with one another and for a PC to communicate with a remote LAN. A computer communication network is therefore defined as either a wide-area network (WAN) or a local area network (LAN) connected together by possibly numerous digital telecommunications services. The collection of applications hosted on different PCs and the interconnection of those PCs presents a challenging task. For example, there are numerous applications which can be implemented on hosts manufactured by possibly different vendors, each of which may be managed by a variety of operating systems. Networking capability is provided by software systems that implement standardized interfaces specifically designed for the exchange of information among heterogeneous PCs.

In an effort to bring compatibility to the various operating systems and PC architectures, the international standards organization (ISO) developed an open systems interconnection (OSI) reference model. The OSI reference model defines various layers ranging from the lower physical layer (network cables and host adapter hardware) to the upper application layer (software needed to send communication messages over the network). Between the physical layer and application layer are various other layers used to format (i.e., organize) various dialogues or "protocols" between a source PC and destination PC. More specifically, a data link layer adjacent the physical layer is used to establish activation, maintenance and deactivation of data link connections, character and frame synchronization, and grouping of bits into characters and frames. The data link layer is thereby used to establish flow control of frames of communication messages sent between PCs. A network layer established at a layer above the data link layer provides common software interface and is transparent to differences in the underlying hardware of various PCs interconnected to the network. Software of higher layers can run on any lower layer hardware due to the compatibility afforded by the network layer.

The data link layer and the network layer, in combination, defines the basic protocol used in the communication network. A communication message transmitted under a given protocol is divided into a number of sub-messages called protocol data units or "packets." Packets are established to contain all the information required for the receiving communication entity (i.e., PC) to provide the called upon service. Thus, a packet is a block of data that is strictly formatted to include both the communication submessage as well as control data needed to effectuate connection between a transmitting and receiving entity. All communication messages are therefore divided into one or more packets, the length of which is carefully controlled. Dividing communication messages into multiple packets enables the network to be shared without interference and interminable waits for access.

Service primitives associated with the data link layer include both connection-mode primitives and connectionless-mode primitives. For connection-mode primitives, a connection must be established between two PCs within the network before they can exchange a packet. However, for connectionless-mode communications, connection is established by placing addressing information within a "field" associated with each packet. Placing addressing information, and attributing that information to a particular packet is often referred to as datagram service. Datagram networks have the advantage of not having to establish connections before communication takes place. However, they have the disadvantage in that every packet must contain a field. The field is attributed to each packet, for example, as a header or a footer to that packet. The field defines destination and source identification as well as error-correction information. Accordingly, the field contains a plurality of bits needed to perform those functions.

A field associated with a particular packet is dependent upon the protocol used in forwarding that packet. Obviously, if the communication protocol changes, the field must also change, otherwise the destination PC will not recognize that which the source PC has transmitted. There are numerous protocols currently being used in WANs and LANs to effectuate communication among PCs. A skilled artisan in modern communication systems generally recognizes all these various protocols. For example, protocols which are currently popular, but certainly not inclusive of all protocols, include TCP/IP, Ethernet, frame relay, DDS, ATM, X.25 and Sonet. Communication protocols allow use of, and are designed to recognize, various topologies (i.e., linear, ring and star topologies), various hierarchies (i.e., client/server, peer-to-peer, Ethernet, AppleTalk, token ring, ARCnet and FDDI).

In many instances it is necessary to interface one protocol to another protocol and possibly to change protocols along various communication links. For example, there may be one protocol used between a PC and a switching node, while another protocol is used between switching nodes. More specifically, one protocol may be used to transmit packets along an access line between PCs or between a PC and a switching node. Further, another protocol may be used to transmit packets along a trunk.

It would be beneficial to derive a communication system which can be adaptive to various protocols. For example, the desired communication system could recognize fields of one protocol during one instance and then be re-configured to recognize fields of another protocol during another instance. Re-configuration is a problem which must be solved in order to allow a packet processor to send and receive different protocols. Essentially, the desired re-configurable packet processor must be one associated with network cards associated with a LAN as well as a router which can link a LAN to another PC possibly via the public switched telephone network (PSTN).

SUMMARY OF THE INVENTION

The problems outlined above are in large part solved by a communication system hereof. The present communication system employs a re-configurable packet processor. The packet processor can be employed at any communication link position, for example, at the host adapter or at a router (or gateway). The packet processors are reconfigured so they can recognize substantially any communication protocol. More specifically, the packet processors recognize various types of packets or field information within those packets. The packet processor hereof is designed to recognize certain types of fields and then, due to its re-configurability, the packet processor can recognize other types of fields associated with an altogether different protocol. The packet processor thereby allows a more flexible communication link at the data link layer and network layer associated with the OSI reference model. Thus, modifications to the other layers within the OSI reference model can be readily accommodated by modifications to the data link and network layers only.

The re-configurable packet processor can recognize varying fields within numerous type of packets. This includes the ability to recognize fields (headers and/or footers) within fast packets or cells associated with asynchronous transfer mode (ATM) networking. It is contemplated that the packet processor recognize fields that not only indicate addresses but also possibly fields which include instructions. It is therefore the intention of the present processor that it have several subsystems which can be altered to send and receive various field formats, and more specifically, to recognize those formats as valid protocols. It is therefore a benefit that the packet processors subsystems be reconfigured to allow this function. The re-configurable subsystems include, according to one embodiment, a instruction decoder, a sequencer, a execution unit, a register select logic block and a bus interface unit.

It is contemplated that each of the subsystems can be reconfigured by a varying amount. It is further contemplated that not all subsystems need be reconfigured if changes to fields (or protocols) are minor. For example, bus interface unit need not, in all instances, be reconfigured and that many times the only change required to effectuate protocol modification is possibly within the instruction decoder and/or execution unit. Reconfiguration of various subsystems can occur to a varying degree, using, according to a preferred embodiment, either programmable logic cells or a programmable state machine.

Programmable logic cells are employed to implement, in hardware programmable fashion, the function of each packet processor subsystem. The cells are arranged in an array interconnected by a matrix of interconnect. For example, the re-configurability of one subsystem may require only a portion of one logic cell, whereas another subsystem may require numerous logic cells interconnected within an array. Still further, each cell within the array can be programmed different from one another and thereafter, programmably interconnected by switch matrices at the juncture of the interconnects. Preferably, each cell contains a dedicated random logic portion (combinatorial logic) and storage elements (sequential logic). The dedicated portions can be reconfigured so that they are active or inactive depending upon how they are programmed. Preferably, the random logic portion comprises a pair of non-volatile random access memory look-up tables while the storage portion comprises a pair of latches. It is preferred that the logic portion be volatile with configuration stored in EEPROM or flash. The look-up tables can be electrically reconfigured based on well-known RAM programming, while the interconnection between the look-up tables and the storage elements are programmed by a programmable control register output fed to mutiplexers interposed therebetween.

The present packet processor is preferably embodied upon a single monolithic substrate. Portions of that substrate are dedicated to particular subsystems with defined metal conductors arranged upon the substrate between substrate areas in which the subsystems are confined. Each subsystem area is therefore bounded within a particular substrate area. Further, each subsystem comprises one or more logic cells, each of which can be programmed in numerous ways. Dedicating specific areas for re-configuration of specific subsystems and dedicating hard-wire connection therebetween ensures a more optimal circuit layout of the overall processor. Essentially, utilizing dedicated areas to specific configurable subsystems helps eliminate the possibility that interconnection of one subsystem to another subsystem occurs across a major portion of the monolithic substrate. By isolating re-configuration to small portions of the substrate and maintaining fixed interconnections between subsystems proves beneficial in reducing speed degradation of the ensuing integrated circuit processor.

Another benefit is the use of state machines to model each particular subsystem based upon the packet handling requirements of that subsystem. Thus, instead of using dedicated hardware (or logic cells) and then programming that hardware, each subsystem can be modeled as a state machine. Depending upon the extent by which the transition to another state requires random logic or sequential storage, the model can be thereafter implemented in hardware as configurable logic portions and/or sequential storage elements. For example, an execution unit may entail primarily random logic and therefore can be configured as essentially two states: an existing state and a next state arrived at by configuring a logic portion of one or more logic cells. A sequencer, on the other hand, contains essentially storage elements with possibly numerous operational states. A sequencer can then be modeled as containing a state register which is continually updated by a configurable next state logic block and, more specifically, sequential storage elements which are configured to output in sequence the state of each state register.

Broadly speaking, the present invention contemplates a communication system adapted for coupling to a PSTN. The communication system comprises a computer system and a router interposed within a path of data which exists between the computer system and the PSTN. The router serves to route data to and from the computer system, and comprises a communication port and a processor. The data is divided into a plurality of packets containing a first set of fields which are formatted according to a first communication protocol. The first set of fields can be changed to a second set of fields depending upon the protocol desired. Thus, the second set of fields can conform to a second communication protocol. The processor is configured to perform processing in response to the first set of fields during a first time period, and then is reconfigured to perform processing in response to the second set of fields during a second time period.

The present invention further contemplates a host adapter operably placed in a communication path of a network of computers. The host adapter comprises a communication port and a processor. The communication port is coupled for transferring data arranged within a first packet, wherein the first packet is formatted with a field indicative of a first communication protocol. The communication port is also coupled for transferring data arranged within a second packet, wherein the second packet is formatted according to a field indicative of a second communication protocol. The processor comprises a series of subsystems contained upon a single monolithic substrate. At least one of the subsystems is configured with at least a portion of an array of logic cells programmed to recognize and execute the data within the first packet. At least one of the series of subsystems is re-configured with at least a portion of the array of logic cells reprogrammed to recognized and execute the data within the second packet. The logic cells are either taken from a random set of hardware-dedicated logic cells programmed to the desired function or, in the alternative, are derived from a state machine model of the desired function.

The communication system hereof operably transfers various types of communication messages formatted in numerous ways. The message comprises a packet of binary bits divided into data bits and field bits. The field bits indicate a particular communication protocol. Those field bits can change from a first set of field bits to a second set of field bits in accordance with a change to the communication protocol. According to one embodiment, the processor includes an instruction decoder, an execution unit, a register file and a register select file. The instruction decoder execution unit and register select files can be reconfigured in various ways depending upon whether the communication message contains the first set of field bits or the second set of field bits.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
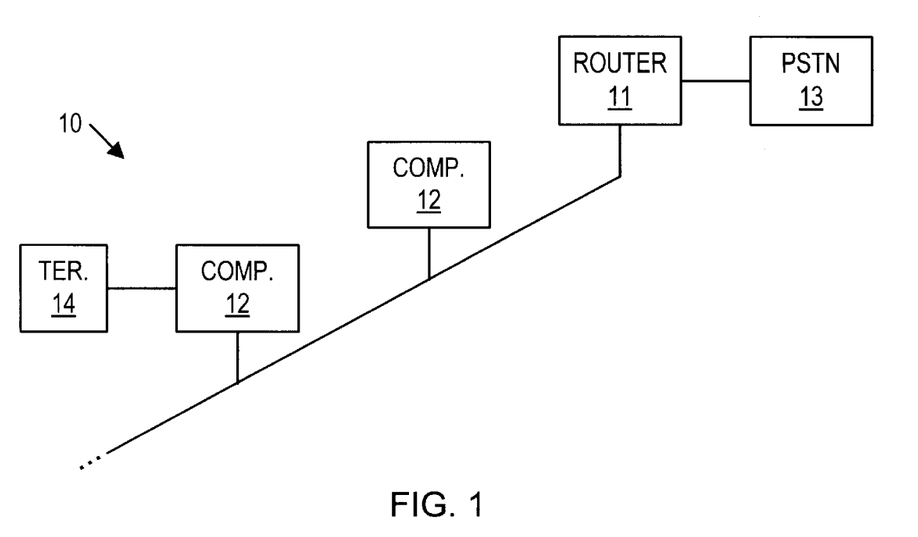
FIG. 1 is a block diagram of a communications system employing a router coupled between a LAN and a PSTN trunk.

Referring now to FIG. 1, the communication system which incorporates the preferred embodiments of the present invention is shown. FIG. 1 illustrates a router 11 which connects to one or more networked computer systems 12, and which also operably connects to the public switched telephone network (PSTN) 13.

Each computer system 12 includes an input/output device, such as an input/output terminal 14. The computer systems 12 are linked together by access lines which extend as various topologies within a LAN. Router 11 serves to connect the communication protocol within the LAN to PSTN 13, and vice versa. It is noted that router 11 is typically remote from PSTN 13 and the various remote users linkable thereto. Accordingly, router 12 and more specifically communication logic within router 12 employs a local packet processor to carry out communication between PSTN 13 and computer systems 12. Further, each computer system 12 includes a packet processor for allowing input/output on terminal 14 to be transferred across the LAN.

Figure 2:
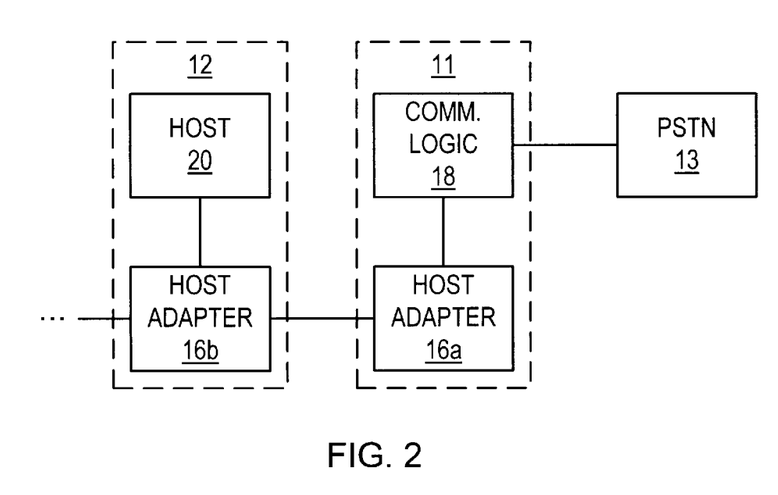
FIG. 2 is a block diagram of a router and networked PC.

Router 11 interfaces to at least one computer system and preferably a network of computer systems 12. Router 11 may be configured to interface to any of the various types of computer systems or networks. Thus, one or more of the network computer systems 12 connect through router 11 to PSTN 13 using, for example, various protocols. Referring to FIG. 2 a block diagram of router 11 and computer system 12 is shown. Router 11 operates to route communication messages across different networks with different topologies. Router 11 also preferably performs gateway functions, i.e., router 11 includes logic for translating between different protocols. The method of translation, according to one embodiment, is to use re-configurable sub-systems within the packet processor of router 11 as well as the packet processor of computer 12. The packet processors form a part of host adapters 16a and 16b. Adapter 16a and 16b, in combination with communication logic 18 provide communication linkage from a PC host 20 to PSTN 13.

Re-configuration of packet processors within adapters 16a and 16b enables a network to connect to a mainframe. More specifically, this allows a Novel using NetBeui to interface to, for example, a TCP/IP network, such as a Unix network or the Internet. Thus, router 11 operates at the top three layers of the OSI reference model. Router 11 is shown in FIG. 1 to connect to PSTN 13. However, router 11 may also be adapted to couple to an asynchronous transfer mode (ATM) network, a fiber distributed data interface (FDDI) network, and X.25 network, a synchronous optical network (SONET), an Ethernet network among the LAN system computers, or other types of communication media which employ distinguishing protocols, as desired.

According to a preferred embodiment, communication logic 18 presents an ISDN interface for coupling to PSTN 20. Communication logic 18 thereby involves logic for providing, for example, more efficient bus utilization and transfer of data to and from various subsystems associated with logic 18. Transfer occurs across communication system 10 to and from those subsystems via PSTN 13 or networked computers 12. Router 11 and computer systems 12 each preferably includes various network controllers within their respective host adapters. For example, host adapters 16a and 16b can include an Ethernet controller for effectuating a LAN. An Ethernet controller can, for example, be provided to a 10Base-T Ethernet connection.

Figure 3:
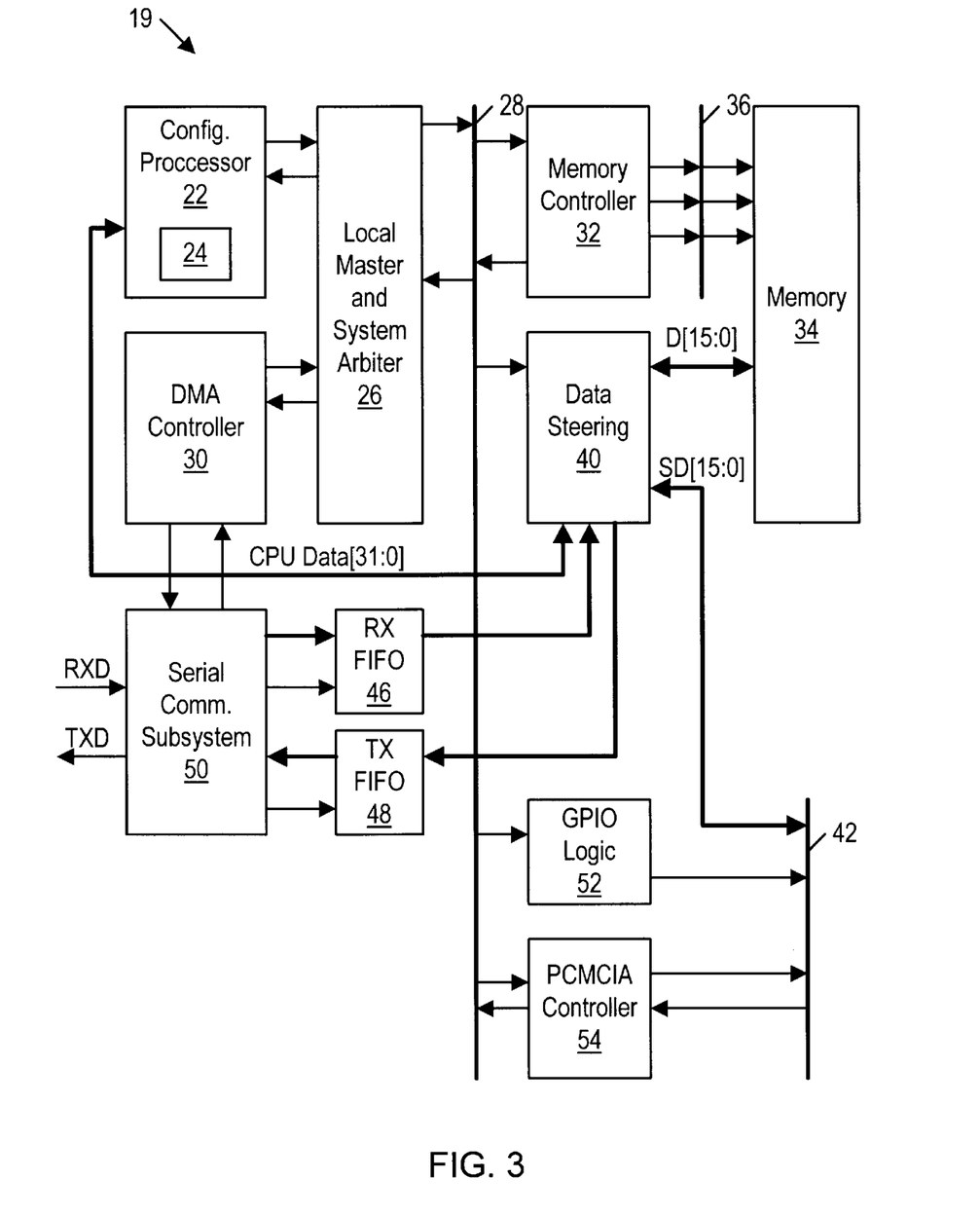
FIG. 3 is a block diagram of communication subsystems embodied within a router of FIGS. 1 and 2.

Referring now to FIG. 3, a block diagram of communication subsystems embodied within either router 11 or network computer systems 12 is shown according to one embodiment hereof. The communications subsystems are denoted as reference numeral 19, and include a configurable packet processor 22. Processor 22 includes inter alia an internal or external cache system 24, according to one embodiment. The cache system 24 included within CPU 22 is found in, for example, microprocessors employing the x486 and Pentium® architectures. If desired, however, processor 22 need not have a cache system 24. Such processors include the earlier versions of, for example, the 8088 and 8086 architectures.

Packet processor 22 preferably couples to a local master and system arbiter logic 26. Arbiter 26 couples to an internal bus 28, herein referred to as the local system bus. Arbiter 26 performs arbitration functions for controlling access to system bus 28. In so doing, arbiter 26 performs bus mastering functions.

A direct memory access (DMA) controller may, for example, be coupled to arbiter 26. Alternatively, DMA transfers may be performed by direct input/output using, for example, packet processor 22. DMA controller 30 performs direct memory access operations. Thus, DMA controller operates through local master 26 to perform transfers between devices on system bus 28 without requiring host/local processor intervention. More specifically, DMA controller 30 allows access to memory by data routed from a communication port (via steering logic) without requiring transfer or set-up operations be performed by processor 22.

The communication system 19 also preferably contains a memory controller 32 which couples the system bus 28. The memory controller is adapted for coupling to memory 34. As shown, memory 34 is preferably a dynamic random access memory (DRAM). Thus, memory controller 32 is preferably a DRAM controller. As shown, DRAM interface 36 may be included between controller 32 and DRAM 34. Also coupled to system bus 28 along with memory controller 32, is a data steering logic 40. Data steering block 40 may be coupled to PCMCIA/ROM external bus 42. External bus 42 provides an interface for PC cards which are compatible with a personal computer memory card internal association (PCMCIA) standard. External bus 42 also provides an interface for read only memory (ROM). Data steering logic 40 also couples through a data path to memory 34. Data steering logic yet further couples to processor 22 as well as to receive FIFO device (RX FIFO) 46 data and to transfer FIFO (TX FIFO) 48 data.

Data steering logic 40 operates by manipulating a data transfer path. Data transfer in accordance with steering of that data allows each device within system 19 to operate using a single memory, for example. Data steering logic 40 can therefor selectively couple, or "steer" the data between memory 34 and various devices operably linked to system bus 28. Those devices are shown to include processor 22, RX FIFO 26, TX FIFO 48 and PCMCIA/ROM external bus 42. Based upon control signals sent to data steering logic 40 via system bus 28, data path between bus masters and memory 34 is reconfigurable.

Communication system 19 includes a serial communication subsystem. Serial communication subsystem provides a serial communication interface to external communication media. As discussed supra, router 11 can provide various interfaces through, for example, PSTN 13. Serial communication subsystem is preferably any interface which allows transfer of that interface. As shown, serial communication subsystem 15 includes receive data input (RXD) and transfer data output (TXD). Serial communication subsystem 50 is coupled to provide receive data to the receive FIFO 46. The receive FIFO 46 provides data to steering logic 40. Serial communication subsystem 50 is also coupled to receive data from transfer FIFO 48. In an alternative embodiment, receive FIFO 46 and transfer FIFO 48 may be coupled directly to system bus 28.

Communication system 19 preferably includes general purpose input/output (GPIO) logic 52. GPIO logic 52 is coupled through system bus 28 and also couples to the PCMCIA/ROM external bus 42. GPIO logic 52 provides general purpose input/output operations between external bus 42 and internal bus 28. GPIO logic 52 can therefore be programmed to receive input data or transfer output data in accordance with, for example, control indicia within a re-configurable register. Storage of input data is provided by a storage register, for example. Further provided with communication system 18 may be a PCMCIA controller 54. Controller 54 is coupled between system bus 28 and external bus 42.

It is recognized that the various subsystems of FIG. 3 are but one example of an arrangement of devices which transmit and receive communication messages divided into packets. The subsystems, and preferably the configurable processor 22, produce and recognize fields within the packet so that the associated data can be processed and/or steered to its appropriate subsystem. Thus, the various subsystems are provided as but one example in which a communication system can be arranged within router 11 or computer 12. The general operation of communication system 19 is somewhat evident from the particular arrangement shown in FIG. 3. Configurable processor 22 is operable to perform transfers onto and from memory 34 via, for example, data steering logic 40. Transfers are effectuated by a request signal forwarded onto the bus. The bus request signal can be, for example, the BREQ signal known the x486 architecture. For example, depending upon the amount of data received, buffer 46 can generate either a high priority DMA request or a low priority DMA request. Depending upon its priority, DMA transfers can occur in order to prevent FIFO overruns or underruns. Bus arbiter 26 serves to acknowledge, for example, low priority DMA transfer request preferably only when no other requests are pending and the processor is not currently using the bus. If arbiter 26 receives a higher priority request prior to or immediately after the low priority DMA transfer request, but before the DMA transfer is issued, bus arbiter 26 is operable to generate a signal indicating a request for system bus 28. The various arbitration schemes which can be used, and the routing of data to and from the communication path, and its contention with processor 22 data, need not be described for purposes of brevity. It is recognized, however, that various arbitration techniques and mastership principles can be used, all of which are recognized to the skilled artisan.

Figure 4:
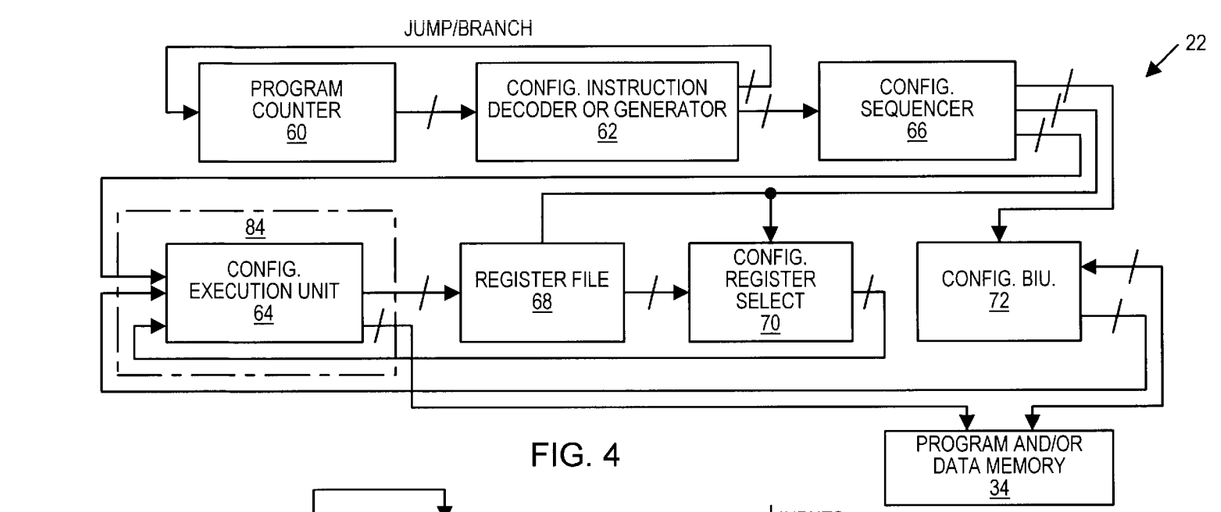
FIG. 4 is a block diagram of a packet processor employed as a host within a router or networked PC of FIG. 2.

Referring to FIG. 4, details regarding the various subsystems of configurable packet processor 22 are shown. Packet processor 22 includes a program counter 60 generally known to those skilled in the art as a mechanism by which a processor keeps track of the location within program memory it should go to fetch an ordered sequence of instructions. Program counter 60 contains the address of the next instruction to be fetched. Processor 22 updates or increments the program counter 60 every time it fetches the instruction. When a jump instruction is inserted into the main program, the normal sequence of the program is suspended. The jump instruction directs program counter 60 to some address within the main program memory other than the next sequential address. A special jump instruction, called the branch, in the main program calls out a subroutine. The branch instruction contains the starting address of the subroutine, and this is automatically inserted into program counter 60.

Jump and branch instructions can be periodically updated as a benefit gained by a configurable instruction generator portion of a configurable instruction decoder 62. Fetching instructions from program memory typically involves two separate operations. First, the processor transmits the address of the instruction in program counter 60 to the internal or external memory device shown in FIG. 3 as reference numeral 34. Memory 34 then transfers the contents the address location to the processor, where it is temporarily stored in a dedicated register called the instruction register. The contents of the instruction register are then decoded by the decoder 62 and, in association with the timed clock pulses, establishes the appropriate data transfer paths within the system and executes the various other activities called out by the particular instruction.

Configurable decoder 62 optionally contains an instruction generator. The instruction generator can be programmably modified so that it produces jump or branch instructions during different times and in response to different addresses called from program counter 60. Thus, generator 62 is adaptable with programmable logic cells in accordance with the description set forth infra.

The instructions executable by execution unit 64 can be of various types. For example, execution unit 64 can be called upon to execute a macro instruction which is a composite of several micro instructions. The micro sequence of micro instructions can be hard-wired into the logic of the control unit, i.e., within a configurable sequencer 66. Typically it is said that macro instructions are complex instructions containing a sequence of micro instructions addressed by the macro instruction. Thus, a macro instruction input results in a series of micro instructions that are also in binary form and are identified as control signals similar in effect to the control signals sent from decoder 62. According to one embodiment, the micro instructions are stored in an array of storage cells (i.e., configurable memory) in the desired sequence in which they are called. According to an alternative embodiment, the micro instructions are stored in programmable logic. The macro instructions are used to specify the starting address of the respective group of micro instructions and a special counter, called the micro program sequencer, would automatically increment the starting address, similar to the familiar program counter when executing either the main program or a subroutine. As will be described infra, sequencer 66 and, more specifically, the configurable memory or programmable logic can be altered in various ways to reorganize the micro instructions or sequence of micro instructions called upon. That reconfiguration is shown to be useful, in conjunction with the other subsystem reconfigurations to process different communication protocols.

Once the instructions are properly arranged according to an execution sequence, execution unit 64 carries out those instructions on data forwarded to unit 64 from memory 36. If the instruction is a multi-word or multi-byte instruction, additional machine cycles will be required to fetch the requisite data from memory 34. Execution unit 64 comprises, in part, Boolean logical blocks with carry forth various arithmetic computations. The ALU contains, for example, an adder that functionally performs only binary additions (subtraction is performed by complement addition) on two operands that may be supplied by any components of the system such as internal registers, accumulators, data memories, or I/O devices. For example, an accumulation operation may be performed by storing results of an addition in a register file 68. For example, register file 68 is often used if an instruction program calls for the contents of the memory location to be added to the contents of the accumulator. In those instances, the result is stored in the same accumulator, and the accumulator becomes both a source and a destination register. The location in which those results are stored can be modified based on changes to a register select logic block 70. Logic block 70 is therefore a programmable logic block which modifies execution unit 64 and, more specifically, operations from unit 64 to a specific location (or register within register file 68).

Execution unit 64 as well as register select logic 70 predominantly comprise logic which can be reconfigured in various ways so as to perform different operations and to store the result of those operations in different register files. Thus, changes in a communication protocol can be translated to changes in execution unit 64 as well as register select logic 70. Preferably, those changes are performed by programming primarily a logic portion of a logic cell described below.

Also configurable within packet processor 22 is a bus interface unit 72. The bus interface unit, or bus unit, helps provide a physical interface between a local bus (or system bus) and a peripheral bus. Thus bus unit therefore serves to accommodate differing protocols and speeds associated with the busses between which it is interposed. Typically, a bus unit comprises address drivers and receivers, write buffers, data bus transceivers, bus control logic, etc. Bus interface unit 72 may also include an internal cache control logic which monitors input signals to determine when to snoop the address bus and monitors output signals to notify external logic of the result of that snoop operation. Bus unit 72 may also include a mechanism to generate a parity bit for the address during write bus cycles and checks address during external cache snoop operations. Bus unit 72 thereby serves to include both logic necessary for internal cache control as well as storage for buffer operations. As such, bus unit 72 can be configured with both these functions.

Figure 5:
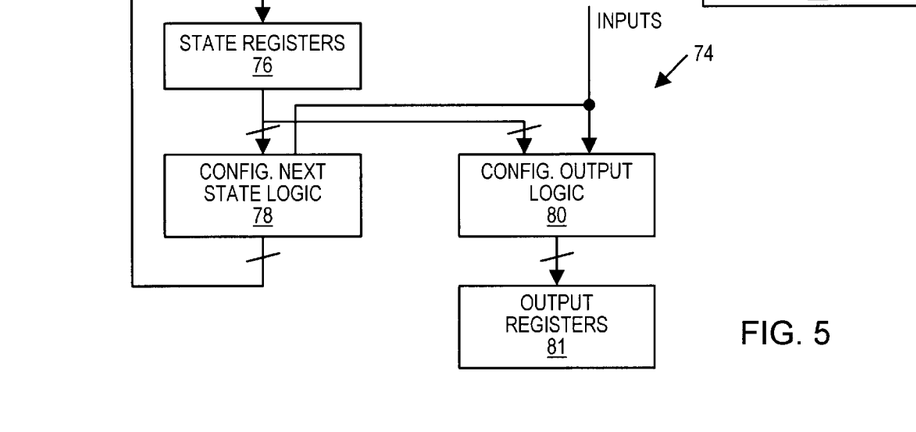
FIG. 5 is a block diagram of a state machine used for representing each configurable subsystem of FIG. 4.

Referring to FIG. 5, each subsystem which is configurable and set forth in FIG. 4 can be represented as a state machine 74 of FIG. 5. The state machine is denoted as having numerous states which can be updated by various transfer operations. Thus, state machine 74 includes a current state stored within a state register 76. The current state is defined to change based upon the logic within next state logic block 78. Given input to block 78, and the logic therein, the current state can transition to another state or remain in its current state. This sequence of states and the transition between those states is generally known to those skilled in the art of sequential operation modeling. The various states output from register 76 are presented to output logic 80 in the order in which they are formed. Output logic 80 retains the particular state in various output registers 81. Thus, output registers 81 contain the sequence of states necessary to model configurable subsystems, such as decoder/generator 62, sequencer 66, execution unit 64, register select logic 70 and bus unit 72. Reduction of a state machine which describes sequential operations to a hardware operation is generally well known to those skilled in computer aided design and more specifically to those skilled in, e.g., Verilog or VHDL. It is worthwhile to note, however, that next state logic block 78 and output logic block 80 comprise predominantly configurable logic, whereas registers 76 and 81 comprise substantially storage elements. Both the logic blocks and storage elements form the two essential features of a logic cell illustrated in FIG. 6.

Figure 6:
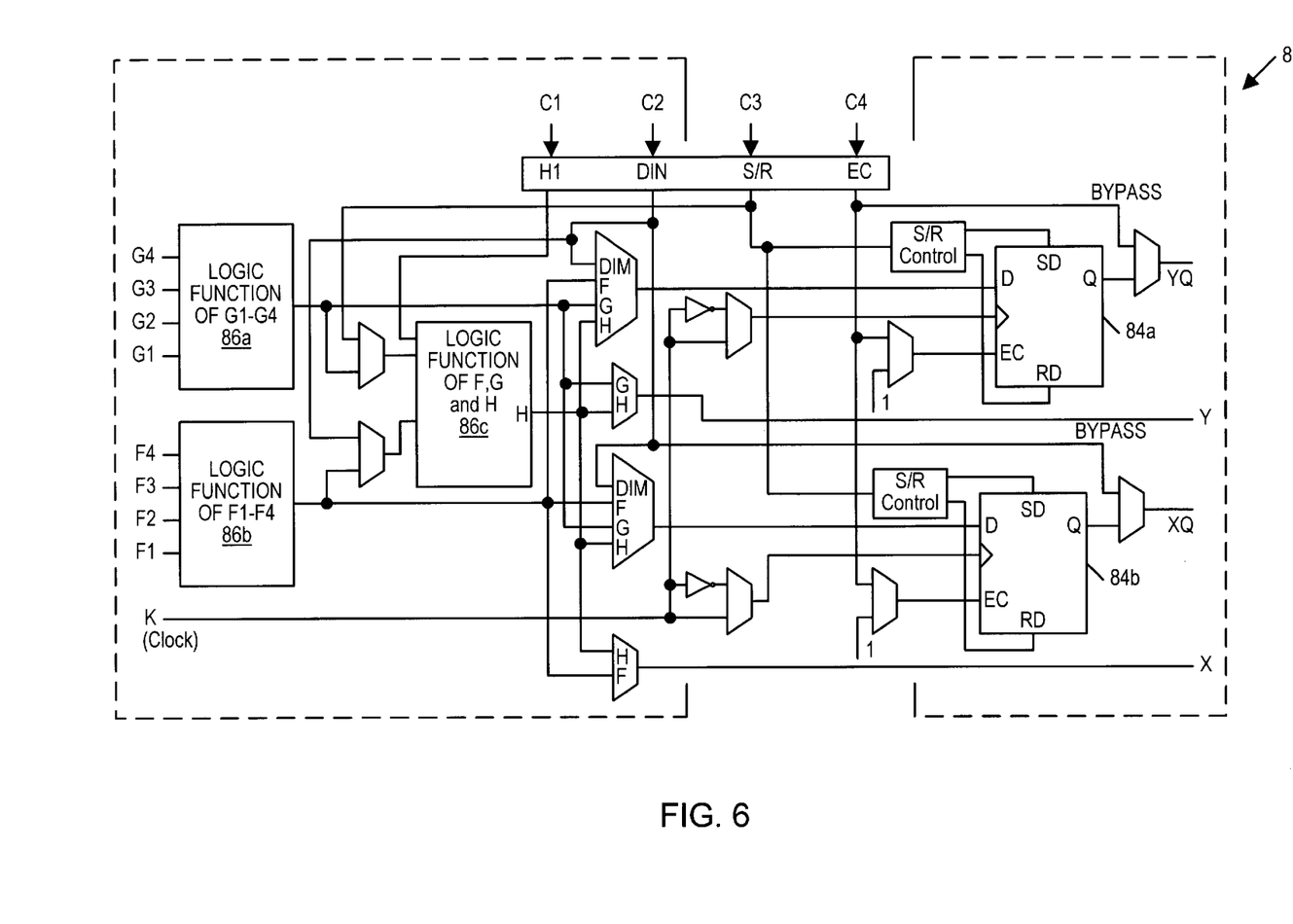
FIG. 6 is a schematic diagram of a logic cell programmable in various ways to achieve functionality of the subsystems set forth in FIG. 4.

Referring to FIG. 6, a configurable logic cell 82 is shown. Logic cell 82 provides the benefits of customization, while avoiding the initial costs, time delay and inherent risks of conventional masked gate arrays. Accordingly, logic cell 82 can be programmed at the site, or in the field. Cell 82 allows architectural versatility in that it can be configured in numerous ways such as, for example, a logic block and/or a storage device. Accordingly, cell 82 is field programmable from a programming device, or master.

Each logic cell 82 preferably contains a pair of flip-flops 84a and 84b and two independent four-input function generators 86a and 86b. Function generators 86a and 86b comprise combinatorial logic which have a good deal of flexibility in that most combinatorial logic functions need less than four inputs, shown in FIG. 6 as G1 through G4 and F1 through F4. A third function generator 86c is also provided. Function generator 86c has three inputs, according to one embodiment, one or both of which can be outputs from generators 86a and 86b. The other input to function generator 86c can arise from another input signal, a suitable input signal being C1. Thus, cell 82 can implement functions having up to nine variables (G1 through G4, F1 through F4 and H1).

Flip-flops 84a and 84b are used to store function generator outputs. Of particular importance is the benefit in implementing the flip-flops independent of the function generators. Input C2 (DIN) is used to direct input to each of the two flip-flops. Another input C3 is used to set or reset the flip-flops.

Cell 82 is configured in accordance with a particular subsystem by programming the memory look-up tables associated with each function generator 86a through 86c and/or programming the select inputs on each multiplexer shown.

Signals from function generators 86a through 86c can exit cell 82 on two outputs X and Y. The arrangement shown in FIG. 6 can therefore be implemented in any of the following functions: (i) any function of up to four variables, plus any second function of up to four unrelated variables, plus any third function of up to three unrelated variables, (ii) any single function of five variables, (iii) any function of four variables together with some functions of six variables, and (iv) some functions of up to nine variables.

Implementing wide functions in a single block reduces the number of blocks required in the signal path, achieving both increased density and speed. Diversatility of cell 82 significantly improves system speed when employed in defined areas of a single monolithic substrate. In addition, the design-software tools can deal with each function generator independently. This flexibility improves cell usage. Referring to FIGS. 4 and 6 in combination, packet processor 22 can be configured on a single monolithic substrate, with memory 34 either being internal to that substrate or external from that substrate. Defined within a particular region of that substrate is a cell or cells 82 used to implement a unique subsystem. Thus, FIG. 4 illustrates an area 84 of the monolithic substrate used to encompass one or more cells which perform an execution unit function. By placing cells 82 in defined, localized regions, interconnect between the programmable portions is minimized. Also, interconnect between subsystems, or between a cell or array of cells, is minimized.

Figure 7:
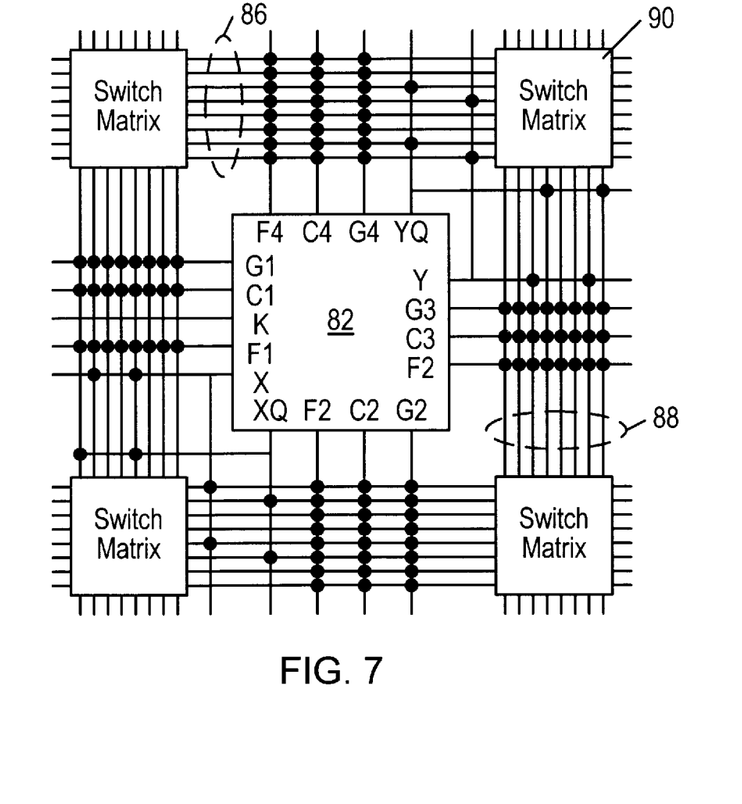
FIG. 7 is a block diagram of a logic cell surrounded by a matrix of interconnect lines.

FIG. 7 depicts logic cell 82 placed within a matrix of horizontally disposed and vertically disposed interconnect 86 and 88 respectively. Inputs to and outputs from cell 82 are routed to interconnect 86 and 88. Additionally, interconnect 86 is selectively coupled to interconnect 88 via switches placed in the overlap regions 90.

Figure 8:
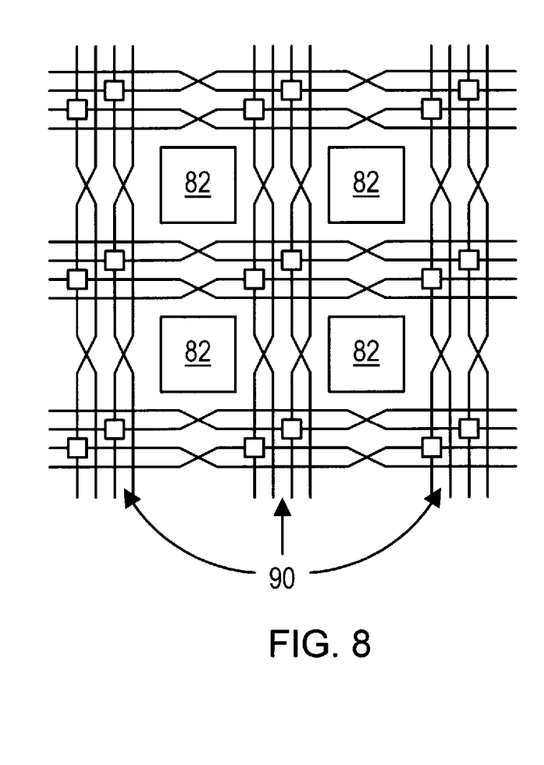
FIG. 8 is a block diagram of an array of logic cells interlinked by the matrix of interconnect lines.

FIG. 8 illustrates an array of logic cells 82. The array contains horizontal and vertical interconnect 86 and 88 as well as switches 90 placed at the crossing or overlap regions. The array is presented to indicate that many subsystem functions may require more than one logic cell 82. More specifically, those functions may require one or more portions of a cell 82 linked together by interconnect 86 and 88. For example, the combinatorial logic predominantly associated with execution unit 64 can be implemented using the logic functions 86a through 86c of one or more cells 82 linked together as an array of cells. Conversely, the storage function associated with sequencer 66 can be implemented as interconnected flip-flops 84a and 84b associated with one or more cells 82.

Figure 9:
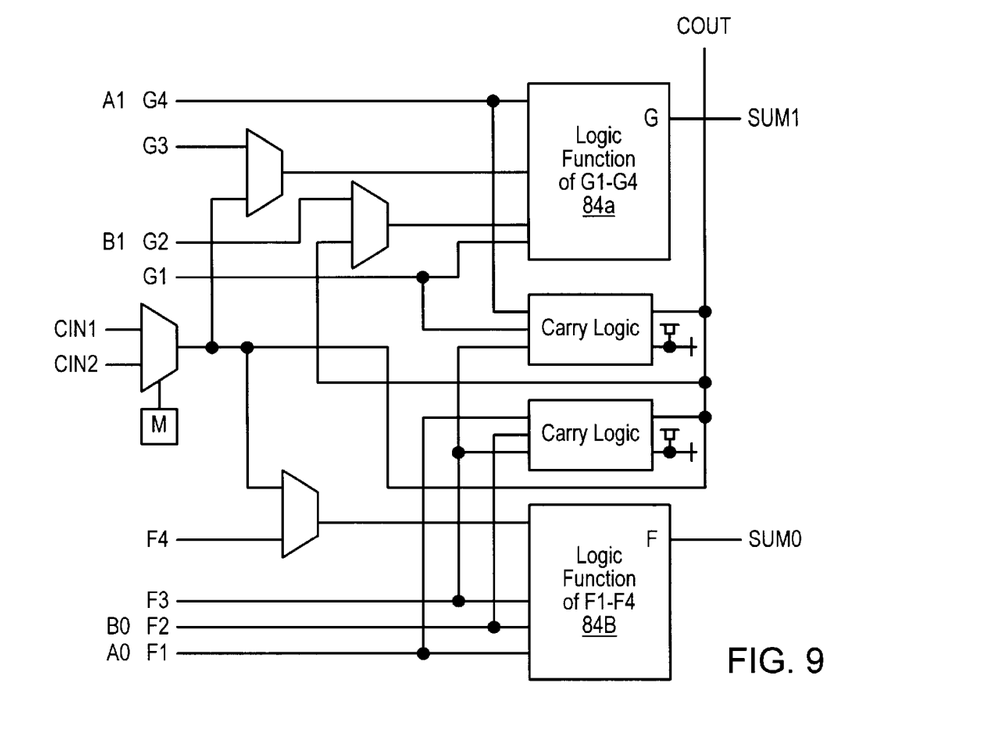
FIG. 9 is a schematic diagram of one or more logic cells programmed to carry out an exemplary arithmetic operation associated with the configurable execution unit of FIG. 4.
Figure 10:
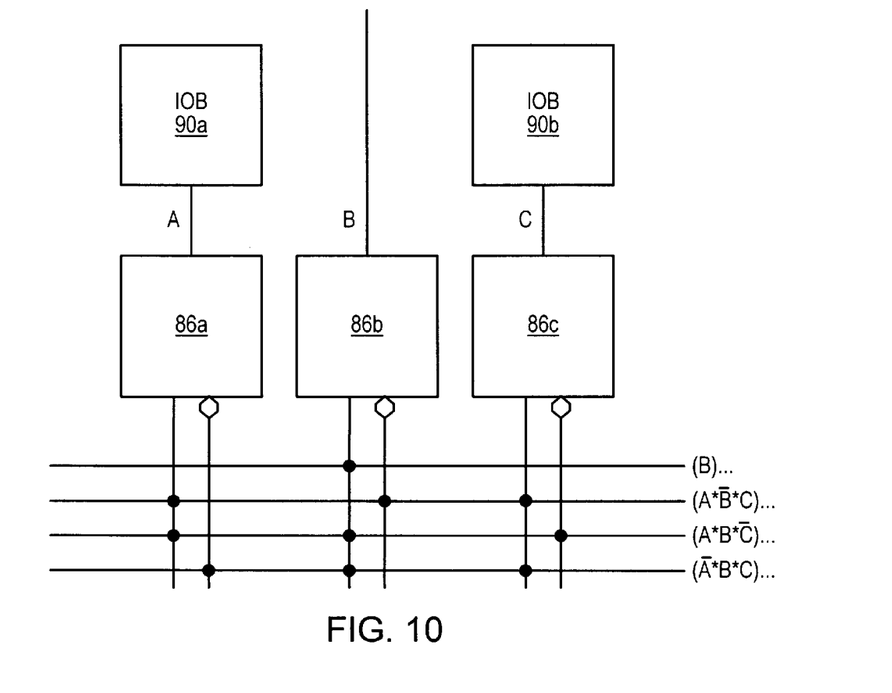
FIG. 10 is schematic diagram of one or more logic cells programmed to carry out examples of various decoding operations associated with the configurable construction decoder of FIG. 4.

FIGS. 9 and 10 illustrate for the purpose of showing several examples of how one or more cells 82 can be implemented to perform certain functions set forth in the subsystems of FIG. 4. The configurations shown in FIGS. 9 and 10 indicate implementations of an add (with carry) function of execution unit 64 as well as a decode function of decoder 62. The add function is illustrated in FIG. 9 while the decode function is shown in FIG. 10. It will be appreciated that the various implementations needed to effectuate the other subsystems shown in FIG. 4 are readily apparent given the implementations shown in FIGS. 9 and 10. Thus, for sake of brevity, specific implementations and architectures programmed from cell 82 for each subsystem need not be shown. All that is needed is a general understanding that various combinatorial or sequential logic can be implemented using one or more cells 82. The particular implementation of course may change and therefore is not shown nor does it need to be shown given the understanding provided by the previous drawings and descriptions.

Referring to FIG. 9, portions of one logic cell are coupled with portions of another logic cell and dedicated as arithmetic logic for the fast generation of carry and borrow signals. Function generators 86a and 86b of one memory cell are coupled to receive multiplexed output arising from input from another logic cell. The carry chain between cells is independent of normal routing resources. Dedicated fast carry logic greatly increases the efficiency and performance of adders, subtracters, accumulators, comparators and counters. However, it is the performance of adders, subtracters and accumulators which is of interest in implementing an execution unit 64. Thus, the two 4-input function generators can be configured as a 2-bit adder with built-in hidden carry that can be expanded to any length.

Referring to FIG. 10, an example is shown for implementing a decode feature. Various logic cells 82 can be combined with one another so as to decode any number of signals. As shown, the input/output blocks 90a and 90b arising from logic function outputs of one cell can be forwarded as inputs a, b and c to logic functions 86a through 86c of another cell. Interconnecting the logic functions of numerous cells can therefore implement wide decoding functions often associated with modern instruction decoders. Each decoder output of each cell generates a high output (resister pull-up) when the AND condition of the selected inputs, or their complements, is true. This is analogous to the NAND term in a typical programmable array logic (PAL) device.

The decoding implementation shown in FIG. 10 indicates a programmed set of AND gates capable of accepting up to 72 inputs. The decoder output of FIG. 10 can be combined with other logic associated with other logic cells to emulate an AND/OR structure. The logic output of the particular decoder function provided in the implementation shown is depicted as four different decoded outputs of numerous potential outputs.

It will be appreciated by those skilled in the art having the benefit of this disclosure that this invention is believed to be capable of achieving a re-configurable processor architecture. The processor is reconfigured to recognize (i.e. dispatch and receive) various protocols each of which has a unique packet and field format. Furthermore, it is also to be understood that the form of the invention shown and described is to be taken as exemplary, presently preferred embodiments. Various modifications and changes may be made without departing from the spirit and scope of the invention as set forth in the claims. It is intended that the following claims be interpreted to embrace all such modifications and changes.

What is claimed is:

1. A host adapter operably placed in a communication path existing between a network of computers, said host adapter comprising:

a communication port through which a communication message is operably transferred, said message comprises a packet of binary bits divided into data bits and field bits;

said field bites indicate a particular communication protocol, and wherein said field bits change from a first set of field bits to a second set of field bits in accordance with a change to said communication protocol;

a processor comprising:

an instruction decoder configured to recognize different instructions depending upon whether the communication message contains the first set of field bits or the second set of field bits;

an execution unit configured to respond to control signals output from said instruction decoder depending upon whether the communication message contains the first set of field bits or the second set of field bits;

a register file connected to receive output from said execution unit; and a register select file configured to select a recipient register within said register file, said recipient register is selected depending upon whether the communication message contains the first set of field bits or the second set of field bits.

2. The host adapter as recited in claim 1, wherein said field bits are indicative of a source from which said message arises, a destination to which said message is to be sent, and error correction information.

3. The host adapter as recited in claim 1, wherein said source comprises a computer within said network of computers, and wherein said destination comprises a computer within said network of computers.

4. The host adapter as recited in claim 1, wherein said communication protocol comprises a protocol selected from the group consisting of TCP/IP, Ethernet, frame relay, DDS, ATM and X.25.

5. The host adapter as recited in claim 1, wherein said communication protocol comprises a packet-switching protocol.

6. The host adapter as recited in claim 1, wherein said communication protocol comprises a token-passing protocol.

7. The host adapter as recited in claim 1, wherein said communication protocol comprises a broadband integrated service digital network (B-ISDN) protocol.

8. The host adapter as recited in claim 7, wherein said packet of binary bits comprises a cell of binary bits associated with said broadband integrated service digital network (B-ISDN) protocol.

9. The host adapter as recited in claim 1, wherein said processor is formed upon a single monolithic substrate.

10. The host adapter as recited in claim 9, wherein said instruction decoder, said execution unit and said register select file are each formed from at least a portion of a logic block arranged within an array of logic blocks interconnected by a matrix of interconnect.

11. The host adapter as recited in claim 10, wherein each logic block is programmable in situ to perform combinatorial logic functions, sequential logic functions, or a mixture of combinatorial logic functions and sequential logic functions.

12. The host adapter as recited in claim 11, wherein said combinatorial logic functions comprises a pair of memory look-up tables, each of said pair of tables is capable of being defined to any Boolean function depending upon whether the communication message contains the first set of field bits or the second set of field bits.

13. The host adapter as recited in claim 12, wherein said Boolean function comprises four possible inputs.

14. The host adapter as recited in claim 11, wherein said combinatorial logic functions comprises:

a pair of memory look-up tables;

a third memory look-up table;

a pair of multiplexers coupled between said pair of memory look-up tables and said third memory look-up table;

four multiplexers coupled to an output of said third memory look-up table, wherein said pair of tables, said third table, said pair of multiplexers and said four multiplexers are capable of being defined to any Boolean function depending upon whether the communication message contains the first set of field bits or the second set of field bits.

15. The host adapter as recited in claim 14, wherein said Boolean function comprises nine possible inputs.

16. The host adapter as recited in claim 11, wherein said sequential logic functions comprise a pair of latches capable of defining a particular state machine depending upon whether the communication message contains the first set of field bits or the second set of field bits.

17. The host adapter as recited in claim 9, wherein said instruction decoder, said execution unit and said register select file are each modeled as a state machine comprising:

a state register configured to store a current state of said instruction decoder, said execution unit or said register select file;

a next state logic coupled to receive an input and, responsive to said input, to change the status of said current state depending upon whether the communication message contains the first set of field bits or the second set of field bits; and an output logic coupled to forward the current state of said instruction decoder to an output register depending upon whether the communication message contains the first set of field bits or the second set of field bits.

* * * * *